United States Patent [19]

Jacobs

[11] Patent Number: 4,965,992
[45] Date of Patent: Oct. 30, 1990

[54] BRIER CUTTER AND METHOD OF USE THEREOF

[76] Inventor: Harold J. Jacobs, P.O. Box 349, Jasper, Ark. 72641

[21] Appl. No.: 421,160

[22] Filed: Oct. 13, 1989

[51] Int. Cl.⁵ .................. A01D 34/08; B26B 13/00
[52] U.S. Cl. .................................. 56/241; 56/242; 30/251; 30/308
[58] Field of Search .................. 56/239–242, 56/333; 30/308, 250, 251, 238, 173, 175, 177, 186–191

[56] References Cited

U.S. PATENT DOCUMENTS

| | | | |
|---|---|---|---|
| 646,048 | 3/1900 | Donzella | 30/251 |
| 2,423,723 | 7/1947 | Page | 30/190 |
| 2,602,994 | 7/1952 | McGary et al. | 30/251 |
| 3,623,222 | 11/1971 | Akers et al. | 30/190 |
| 4,254,549 | 3/1981 | McMullin | 30/251 |

FOREIGN PATENT DOCUMENTS 2031256 4/1980 United Kingdom .................. 30/173

Primary Examiner—Bruce M. Kisliuk
Attorney, Agent, or Firm—Edward R. Weber

[57] ABSTRACT

A device for removing unwanted vegetation consisting of a pole with a pair of cutting members on one end and two control handles on the other end. In use, the end with the cutting members is pulled through the vegetation and as the device moves, the offending vegetation is cut off by the cutting action produced by the pulling movement. If, during the cutting, the unwanted vegetation is found to be supple and yielding, a first handle is depressed. This brings the cutting members closer together and causes the supple vegetation to be sheared off. On the other hand, if, during the cutting, the unwanted vegetation pulls out of the ground and becomes lodged in the device, a second handle is depressed. This permits the cutting members to rotate away from each other thereby releasing the unwanted vegetation from the device.

12 Claims, 2 Drawing Sheets

BRIER CUTTER AND METHOD OF USE THEREOF

FIELD OF THE INVENTION

The present invention relates to implements used to clear land and more particularly, to clear or remove undergrowth or briers. The novel device is of simple construction and allows the user to remove briers reliably and efficiently without injury to himself.

BACKGROUND OF THE INVENTION

Land which needs to be cleared includes all types of vegetation in various stages of development. Some plants will be overgrown and spread out and therefore hard to reach. Others will be young and supple with stems or trunks which yield easily. Some will have well developed root systems which go deep, while others will have root systems which are well developed, yet shallow and spread out.

Farmers, ranchers, and other individuals who require or desire their land to be cleared face a variety of problems when determining how best to clear the land. One of the trickiest, however, has been how to reliably and efficiently remove thorny or prickly bushes (briers) without injury to themselves. It is therefore an object of the present invention to facilitate the easy removal of briers without injury to the user. It is a further object of the invention to provide an implement which will cut briers in various stages of development both reliably and efficiently. It is another object of the invention to provide an implement which is easy to operate. A further object of the invention is to provide a tool which is durable, yet simply constructed. A final object of the invention is to provide a tool which will facilitate clean up of the removed briers. Other objects and features will be in part apparent and in part pointed out hereinafter.

SUMMARY OF THE INVENTION

The present invention has two cutting blades, a length of hollow pole, two handles, connecting linkage, and a means for communicating certain movements between the handles and the blades. The blades are supported by brackets, one of which is attached to a first end of the hollow pole, and are cooperatively arranged by a connecting plate and lever. Opposite the blades at the second end of the hollow pole are two handles, one of which is located on either side of the pole.

In use, the present invention is placed behind a brier or other thorny bush and pulled toward the user. As the device moves, the offending vegetation is cut off by the cutting action produced by the pulling movement. If, during the cutting, a brier is found to be supple and yielding, a first handle is depressed. This brings the blades closer together and causes the supple brier to be sheared off. On the other hand, if, during the cutting, a brier pulls out of the ground and jams the device, a second handle is depressed. This permits the movable blade to rotate away from the fixed blade thereby releasing the brier from the device.

As will be readily apparent, once the successful cutting is completed, the device can be used to move the offending vegetation to a refuse pile for later disposal thereby eliminating the need for the user to handle the brier. Thus it is seen that the present invention is of simple construction and will allow briers to be reliably and efficiently removed without injury to the user.

BRIEF DESCRIPTION OF THE DRAWINGS

In the accompanying drawings in which on of various possible embodiments of the invention is illustrated.

DETAILED DESCRIPTION OF THE DRAWINGS

Figure 1:
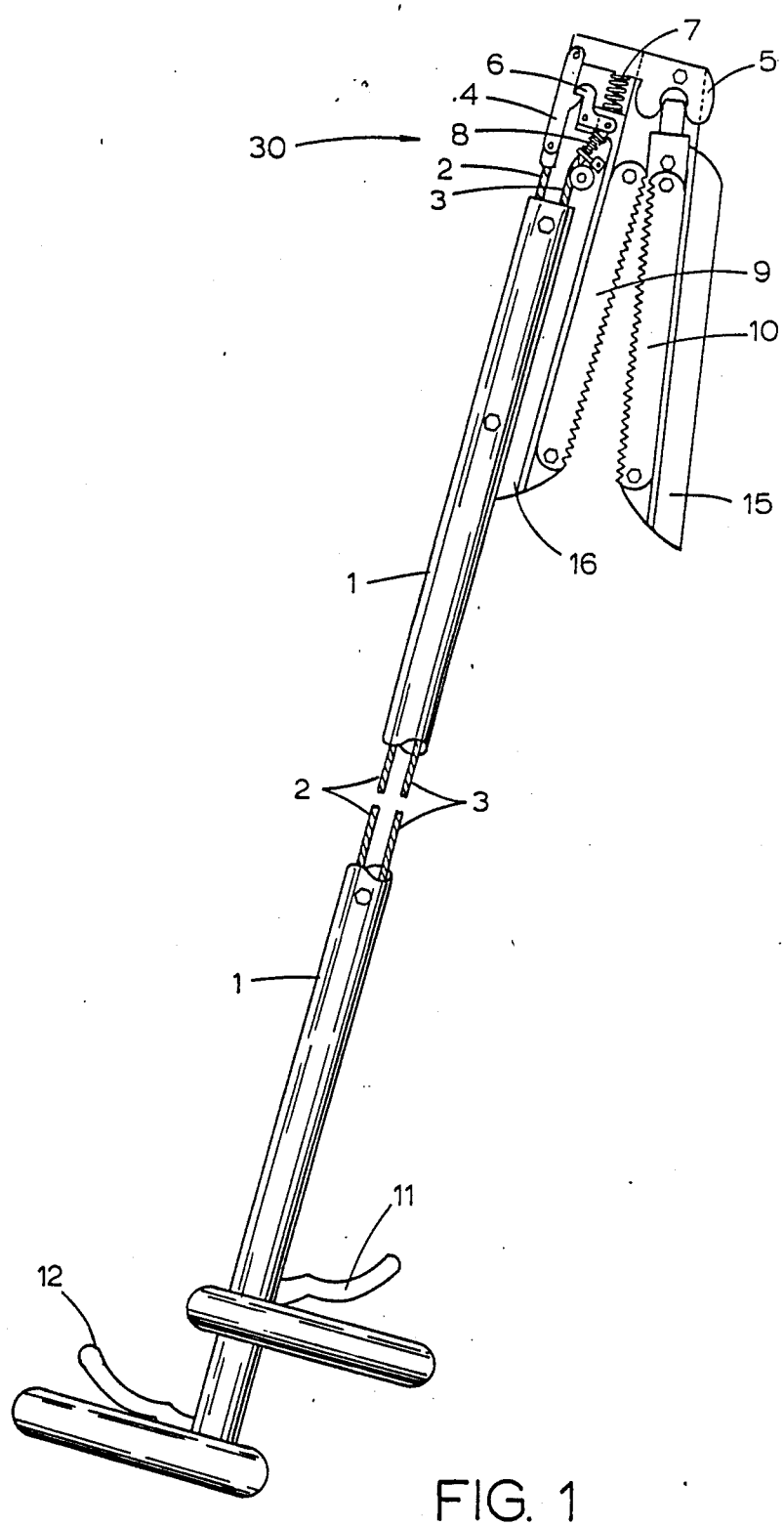
FIG. 1 is a plan view of the brier cutter of the present invention showing the relation of the cutting head and the operating handles.

Referring now to the drawings wherein like reference characters represent like elements, FIG. 1 shows a plan view of brier cutter 30 in which the relative relationship of the primary parts of the device are illustrated.

Figure 2:
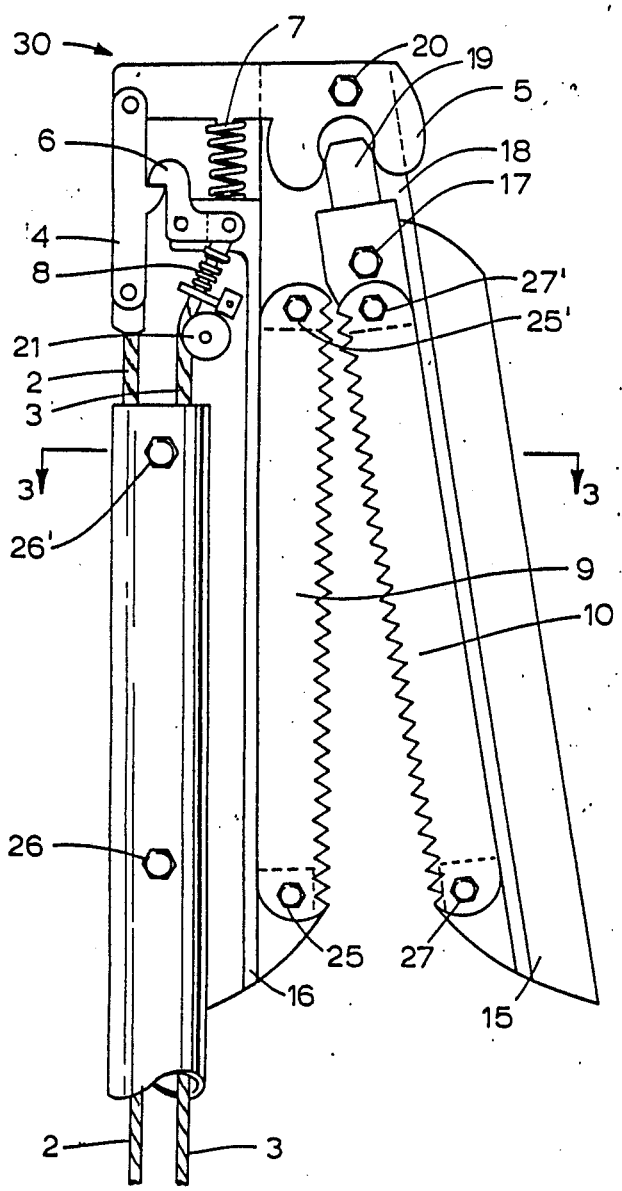
FIG. 2 is a plan view of the head of the present invention.

FIG. 2 illustrates the head of brier cutter 30. In a preferred embodiment, cutting blade 9 is affixed at a first end to a support bracket 16 by conventional means, such as bolt 25, and at a second end to a connecting plate 18 by conventional means, such as bolt 25'. Cutting blade/ support bracket 9-16 is then rigidly attached to a first end of a hollow pole 1 by conventional means, such as bolts 26 and 26'. A second cutting blade 10 is affixed at a first end and a second end to support bracket 15 by conventional means, such as bolt 27 and 27', respectively. Cutting blade/support bracket 10-15 is further pivotally attached to connecting plate 18 by conventional means, such as bolt 17. As will be thus appreciated, cutting blade/support brackets 9-16 and 10-15 are held in cooperative arrangement by means of connecting plate 18.

Projecting from support bracket 15 is cam follower 19, which slidably engages a first end of lever 5. Lever 5 is pivotally attached to connecting plate 18 by bolt 20. The second end of lever 5 is pivotally attached to a second lever 4. The first end of lever 5 is shaped to provide a cam surface which interacts with cam follower 19 so that rotational movement of lever 5 around bolt 20 will produce movement of cutting blade 10 in relation to cutting blade 9. Lever 5 is further provided with an engagement means (not shown) located proximate to the point of pivotal attachment with lever 4. This engagement means mates with a spring 7 which serves to produce a constant bias which will rotate cutting blade/support bracket 10-15 away from cutting blade/support bracket 9-16.

Figure 4:
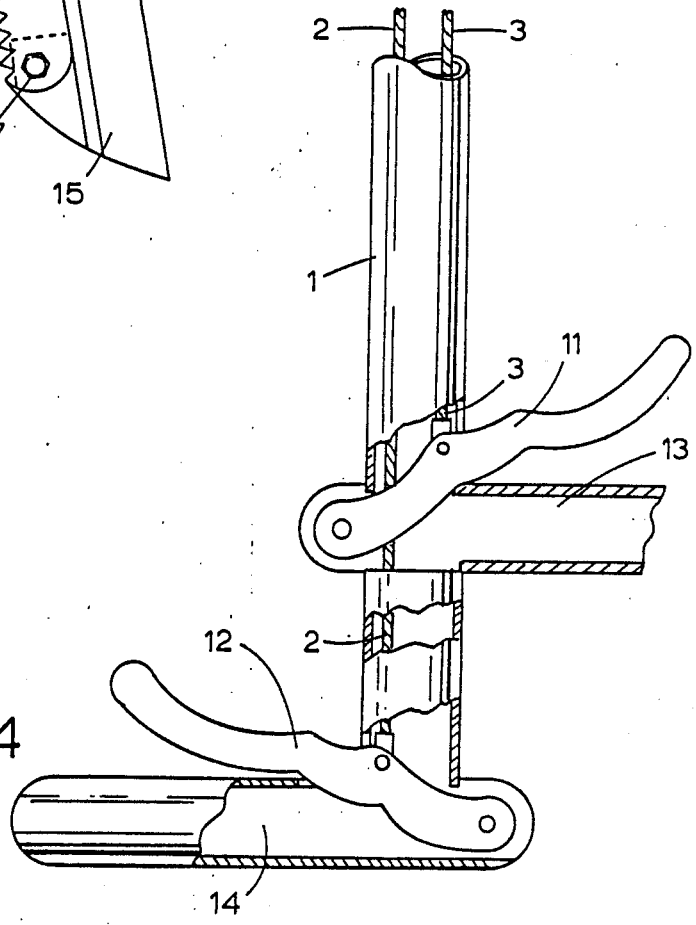
FIG. 4 shows a partial section view of the end of the hollow pole with the two handles, the related pivoted actuators, and the connecting linkage associated with each handle.

Lever 4 has a first end which is pivotally attached to lever 5, as previously indicated. The second end of lever 4 is attached by conventional means to a connecting linkage 2 which runs the length of hollow pole 1 and is attached at its second end to a pivoted actuator 12 (FIG. 4). Lever 4 is further provided with a hooking means which cooperatively engages a latching means 6 thereby resisting the bias produced by spring 7 and maintaining a spaced relationship between cutting blades 9 and 10 under normal working conditions.

Latching means 6 is pivotally attached to support bracket 16 and to a springed attachment means 8. Springed attachment means 8 is attached by conventional means to a connecting linkage 3 which runs the length of hollow pole 1 and is attached at its second end to a pivoted actuator 11 (FIG. 4) The position of connecting linkage 3 within hollow pole 1 relative to support bracket 16 is maintained by a pulley 21.

Figure 3:
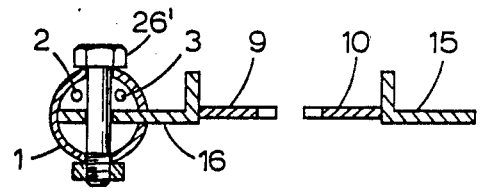
FIG. 3 is a section view along line 3—3 of FIG. 2 showing one cutting blade/bracket arrangement attached to the hollow pole, the connecting linkage of the device running proximate thereto, and a relationship of the two cutting blade/bracket arrangements.

FIG. 3 shows a section view along line 3—3 of FIG. 2 of a preferred embodiment in which cutting blade/support bracket 9–16 is attached to hollow pole 1 by means of bolt 26'. Connecting linkages 2 and 3 are seen running proximate thereto. A relationship between cutting blade/support brackets 9–16 and 10–15 is also illustrated.

As previously indicated, the first end of hollow pole 1 is rigidly attached to cutting blade/bracket arrangement 9–16. The second end of hollow pole 1 is provided with two handles 13 and 14 respectively, as shown in FIG. 4. Handles 13 and 14 are situated on opposite sides of the pole, one handle forward of the other. Handle 13 houses pivoted actuator 11 which is attached to connecting linkage 3. Handle 14 houses pivoted actuator 12, which is attached to connecting linkage 2. Movement of pivoted actuators 11 and 12 will cause the cutting blades to either become closer and shear off supple briers or to open and release a brier which has become caught in the device.

In use, brier cutter 30 is placed behind a brier or other thorny bush and pulled toward the user. As the device moves toward the user, the offending vegetation is cut off by the wedging action produced as the vegetation is forced into the narrow throat between cutting blades 9 and 10. If, during operation, a brier is found to be supple and yielding, pivoted actuator 12 of handle 14 is depressed. Depression of actuator 12 causes connecting linkage 2 to pull lever 4 toward handle 14. This in turn causes lever 5 to pivot counterclockwise around bolt 20. As lever 5 rotates around bolt 20, cam follower 19 follows the cam surface of lever 5 causing cutting blade/support bracket 10–15 to rotate around bolt 17 thereby bringing cutting blade 10 in closer proximity to cutting blade 9. This closer proximity of the cutting blades produces a shearing action and effectively cuts the supple, yielding brier.

If, however, during operation, a brier pulls out of the ground and jams the device, pivoted actuator 11 of handle 13 is depressed. Depression of actuator 11 disengages latching means 6 from lever 4 and permits spring 7 to cause lever 5 to pivot clockwise around bolt 20. As this occurs, the cam surface of lever 5 interacts with cam follower 19 and causes cutting blade/support bracket 10–15 to rotate around bolt 17 and move cutting blade 10 away from cutting blade 9 thereby releasing the brier. As can be deduced, in a successful cutting, the device can be used to move the offending vegetation to a refuse pile for later disposal thereby eliminating the need for the user to handle the brier. As will be clearly understood from an examination of the drawings, depression of actuator 12 rotates cutting blade/support bracket 10–15 around bolt 17 thereby simultaneously returning lever 4 to the position shown in FIG. 1, wherein latching means 6 engages lever 4, thus resetting the device to the normal working position.

As will be apparent from examination of the drawings and the accompanying description, the present invention will provide farmers, ranchers, and other individuals who require or desire their land to be cleared with a reliable and efficient means for removing briers in various stages of development without injury to themselves. Although the present invention has been described and illustrated with respect to a preferred embodiment thereof, it is to be understood that it is not to be so limited since various changes and modifications may be made therein which are within the full intended scope of this invention as hereinafter claimed.

What is claimed is:

1. A device for clearing vegetation consisting of an elongated member, a first cutting member having a cutting edge, a second cutting member having a cutting edge, a first control linkage, a first control means, a latching means, a second control linkage, and a second control means wherein said first cutting member is rigidly affixed to said elongated member adjacent a first end of said elongated member and a second cutting member is pivotally mounted adjacent to said first cutting member; and wherein said first control linkage connects said second cutting member with said first control means, which first control means is mounted adjacent to the second end of said elongated member so that said second cutting member may be pivoted about its mounting point to bring the cutting edge of said second cutting member into a mating relationship with the cutting edge of said first member so that any vegetation which may be located in the gap between the two cutting edges will be sheared off; and wherein said latching means maintains said second cutting member in a position relative to said first cutting member such that the cutting edge of said first cutting member and the cutting edge of said second cutting member form an acute angle so that when said device is pulled through said vegetation, said vegetation is progressively forced toward the apex of said acute angle and effectively sliced off; and wherein said second control linkage connects said latching means and said second control means, which second control means is mounted adjacent to said second end of said elongated member, such that when said latching means is released by said second control means acting through said second control linkage, a biasing means may interact with said second cutting member causing said second cutting member to pivot away from said first cutting member thereby producing an increase in the angle formed by the respective cutting edges of said first and said second cutting members and effectively releasing any vegetation which may have become lodged between said cutting edges when said second cutting member was in the latched position.

2. A device for clearing vegetation consisting of an elongated member, two support brackets, two cutting members, a connecting plate, two levers, a latching means, a spring means, two control means, connecting linkage for each of said control means, and two actuators, wherein a first cutting member is fixedly attached to a first support bracket, which first support bracket/cutting member assembly is rigidly affixed to said elongated member at a first end, and a second cutting member is fixedly attached to a second support bracket, which second support bracket/cutting member assembly is pivotally attached to said connecting plate, and wherein said connecting plate is rigidly mounted on said first end of said elongated member so as to maintain a pivotal relationship between said second support bracket/ cutting member assembly and said first support bracket/ cutting member assembly; and wherein a first end of said second support bracket is a cam follower which mates with a cam portion of a first end of a first lever, said first lever being pivotally attached to said connecting plate and having a second end pivotally attached to a first end of a second lever; and wherein a second end of said second lever is attached to a first end of a first connecting linkage, which first linkage is attached at its second end to a first control means located adjacent to the second end of said elongated member; and wherein said latching means interacts with said second lever in such a fashion as to restrict movement of said second lever; and wherein said first lever has an engaging means which engages a first end of said spring means, said spring means having a second end which interacts with an engaging means mounted on said first end of said elongated member; and wherein said latching means is attached to a first end of a second connecting linkage, which linkage is connected at its second end to a second control means located adjacent to said second end of said elongated member; and wherein said first and second connecting linkage traverse said elongated member in a spaced relationship; and wherein said first and second control means each incorporate a pivotally mounted actuator capable of communicating movement to said second bracket/cutting member assembly via said connecting linkage and said first lever; and whereby when said pivotally mounted actuator of said first control means is activated, said first connecting linkage acting through said first and second levers causes said cam portion of said first lever to actuate said cam follower of said second support bracket/ cutting member assembly in a manner which will cause said second cutting member to move into closer mating relationship with said first cutting member; and whereby when said pivotally mounted actuator of said second control means is activated, said second connecting linkage causes said latching means to disengage said second lever thereby permitting said spring means to actuate said first lever thereby causing said cam portion of said first lever to interact with said cam follower of said second support bracket/cutting member assembly in a manner which will cause said second cutting member to move away from said first cutting member.

3. A device for clearing vegetation according to claim 2 wherein each of said connecting linkages is a flexible device selected from the group comprising rope, wire, chain, and cable.

4. A device for clearing vegetation according to claim 2 wherein said first and said second cutting members have serrated edges.

5. A device for clearing vegetation according to claim 2 wherein said first and said second cutting members have sharpened teeth 6. A device for clearing vegetation according to claim 2 wherein said elongated member is a hollow tube.

7. A device for clearing vegetation according to claim 6 wherein each of said connecting linkages is a flexible device selected from the group comprising rope, wire, chain, and cable.

8. A device for clearing vegetation according to claim 6 wherein said linkage passes through the interior of said hollow tube 9. A device for clearing vegetation according to claim 8 wherein each of said connecting linkage is a flexible device selected from the group comprising rope, wire, chain, and cable.

10. A method of clearing vegetation using a device consisting of an elongated member having a first cutting member rigidly mounted adjacent to a first end of said elongated member and a second cutting member pivotally mounted adjacent to said first cutting member so that the cutting edges of said first and said second cutting members form an acute angle with the apex adjacent to said first end of said elongated member and said opening between said first and said second cutting members being directed generally toward said second end of said elongated member, and wherein said second cutting member is flexibly attached to two control means located adjacent to said second end of said elongated member, which method consists of pulling said device through said vegetation in such a manner that said vegetation is engaged in the acute angle formed by said first and said second cutting members and is sheared off by being forced progressively toward the apex of said acute angle as the device is pulled through said vegetation.

11. A method according to claim 10 wherein supple vegetation which does not shear off is cut by activating a first control means which causes said second cutting member to rotate toward said first cutting member thereby cutting said vegetation with a scissors-like action.

12. A method according to claim 10 whereby vegetation which has become lodged between said first and said second cutting members is released by activating a second control means which permits said second cutting member to rotate away from said first cutting member thereby permitting said lodged vegetation to disengage and drop free.

* * * * *